US006263421B1

(12) United States Patent
Anderson

(10) Patent No.: US 6,263,421 B1
(45) Date of Patent: *Jul. 17, 2001

(54) VIRTUAL MEMORY SYSTEM THAT IS PORTABLE BETWEEN DIFFERENT CPU TYPES

(75) Inventor: Eric W. Anderson, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/458,723

(22) Filed: Jun. 2, 1995

Related U.S. Application Data

(63) Continuation of application No. 08/208,935, filed on Mar. 10, 1994, now abandoned.

(51) Int. Cl.[7] .................................................. G06F 9/30
(52) U.S. Cl. ............................... 712/209; 717/5; 711/202
(58) Field of Search ............................ 395/820, 520, 395/413, 415, 406, 700, 650, 500; 717/5; 712/209; 711/202, 203, 205–207

(56) References Cited

U.S. PATENT DOCUMENTS

| 4,525,780 | * | 6/1985 | Bratt et al. | 364/200 |
|---|---|---|---|---|
| 4,855,905 | * | 8/1989 | Estrada et al. | 364/200 |
| 5,063,499 | * | 11/1991 | Garber | 395/500 |
| 5,313,614 | * | 5/1994 | Goettelmann et al. | 395/500 |
| 5,379,432 | * | 1/1995 | Orton et al. | 395/700 |

OTHER PUBLICATIONS

Rashid, R. et al. "Machine–Independent Virtual Memory Management For Paged Uniprocessor and Multiprocessor Architectures" in *IEEE Transactions on Computers*, Aug. 1988, pp. 896–907, vol. 37, No. 8.

Varhol, Peter D. "Small Kernels Hit It Big," *Byte*, Jan. 1994, pp. 119–128, vol. 19, No. 1.

Abrossimov, V. et al. "Generic Virtual Memory Management For Operating System Kernels" in *Operating Systems Review (SIGOPS)*, Jan. 1, 1989, pp. 123–136, vol. 23, No. 5.

Dasgupta, Partha et al. "The Clouds Distributed Operating System" in *Computer*, Nov. 1, 1991, pp. 34–44, vol. 24, No. 11.

* cited by examiner

*Primary Examiner*—John A. Follamsbee
(74) *Attorney, Agent, or Firm*—Carr & Ferrell LLP

(57) ABSTRACT

A virtual memory for a computer system is provided that is portable between different central processing unit (CPU) types. The system includes a high level virtual memory (HLVM) having high level program codes that are independent of a specific CPU type, a low memory vector table (LMVT) coupled to the HLVM that dispatches a call in response to a high level program code received from the HLVM, and a low level virtual memory (LLVM) coupled to the LMVT having low level program codes that depend on a specific CPU type. The method of operating the virtual memory system includes the steps of generating a high level virtual memory (HLVM) instruction from high level program codes that are independent of specific CPU characteristics and receiving the HLVM instruction in a low memory vector table (LMVT). The method further includes the steps of dispatching an address from the LMVT in response to the HLVM instruction, receiving the address from the LMVT in a low level virtual memory (LLVM), and executing CPU-specific instructions according to program codes in the LLVM corresponding to the address received from the LMVT.

15 Claims, 6 Drawing Sheets

VIRTUAL MEMORY SYSTEM THAT IS PORTABLE BETWEEN DIFFERENT CPU TYPES

This is a continuation of application Ser. No. 08/208,935 filed on March. 10, 1994, and now abandoned.

BACKGROUND OF THE INVENTION

1. Field of the Invention

This invention relates to computer system operating software, and more particularly to a system and method for implementing a CPU-independent virtual memory using a hardware-dependent virtual memory interface which enables the virtual memory software code to be easily ported between unrelated CPU's.

2. Description of the Background Art

Computer facilities that automatically fold programs and data between two or more memory levels are called virtual memory systems. The basic object of virtual memory is to permit programs with very large address space to run as if the programs were loaded in Random Access Memory (RAM). In virtual systems, RAM serves as a window onto the entire address space held in secondary storage such as a disk. If the window is big enough, and if it accurately reflects the active part of total memory, the technique works extremely well.

The success of virtual memory exploits the characteristic that programs tend to access small portions of memory over fairly long periods of computer time. Code loops and manipulations of a data structure are examples of programs that can take advantage of virtual memory. The virtual memory system must detect and maintain in RAM only the working set of a program. As activity gradually shifts to other memory regions, these areas of secondary storage are automatically accessed and brought into RAM. The goal of a virtual memory system is to minimize secondary storage accesses.

The many advantages of a virtual memory system are well known in the art. Foremost, it removes the limit on program size imposed by RAM size, and thus programs execute correctly regardless of actual RAM size. As the size of available RAM increases, program size has also continued to increase making it even more imperative that a virtual memory system be incorporated in a computer system, particularly in a minicomputer system.

Referring now to FIG. 1, a computer system of the prior art is shown. A CPU is connected to a keyboard and a CRT. A common databus connects a disk drive, RAM, ROM, and various software modules to the CPU. The software modules include an operating system (OS), applications, and virtual memory. The OS is for controlling the operation and execution of the computer system. Applications are the programs containing the executable codes that are executed by the CPU and controlled by the operating system.

Referring now to FIG. 2, a block diagram depicting the interaction between various software components and the hardware of the computer system of FIG. 1 is shown. The OS interacts with the applications, the hardware and the virtual memory. A virtual memory (VM) manager interacts with the OS and the hardware in the management of the virtual memory. The VM manager contains a memory management unit (MMU) (not shown) which performs operations within the virtual memory (VM). The MMU is special hardware designed for the virtual memory (VM). The VM manager contains both high level codes and low level codes that control the operation of the virtual memory. The high level codes make up the bulk of the VM manager while the low level codes, which comprise the memory management unit (MMU) codes, make up a small portion of the VM manager. The high level codes of the VM manager contain complex high level codes for implementing various routines and algorithms that are used to manage the operation of the virtual memory. The low level MMU codes are short and simple compared to the high level code of the VM manager. The low level MMU codes primarily control the machine level operations of the MMU.

As depicted in the prior art, the virtual memory is an integral part of the operating system and hardware. The high level codes and the low level codes of the VM manager are intertwined with each other. Consequently, the virtual memory is highly dependent on the characteristics of the processor. A significant problem with virtual memory designs is that the virtual memory designs are generally not portable between differing processors which makes virtual memory designs subject to obsolescence as processors evolve and processor architectures change. Much of the time spent in developing and debugging the complex code of the VM manager is lost whenever a virtual memory design is changed. Thus, there has been a significant need for a virtual memory system that is processor-independent and is portable between differing processors. A CPU-independent virtual memory enables the virtual memory to adapt to different processor designs as computer architectures change and evolve.

SUMMARY OF THE INVENTION

In accordance with the present invention, a virtual memory system comprises a high level virtual memory (HLVM) having high level program codes which manages the virtual memory system. A low level virtual memory (LLVM) is coupled to the HLVM having low level program codes which receives requests from the HLVM. A CPU is coupled to the LLVM responsive to the low level program codes which provides data to the HLVM for management of the virtual memory system. The low level program codes of the LLVM are CPU specific, and the high level program codes of the HLVM are CPU-independent. The segregation of the low level program codes from the high level program codes permits the virtual memory system to be highly CPU-independent. Only modifications of the low level program codes of the LLVM are needed to incorporate another CPU with the virtual memory system.

According to another aspect of the present invention, a low memory vector table (LMVT) provides an interface between the low level program codes and the high level program codes. The LMVT dispatches a call in response to a high level program code in the HLVM which corresponds to a low level program code in the LLVM. The call is an address which provides the location of the corresponding low level program code in the LLVM.

According to another aspect of the present invention, a nanoKernel is coupled to the LLVM and the CPU which translates low level program codes for execution by the CPU. The nanoKernel and the LLVM are specific to the CPU. Thus, when a need arises to use a different CPU, only the codes that are specific to the CPU require modification. The low level program code of the LLVM is much less complex than the high level program code of the HLVM. The development time for incorporating new CPU architectures to a virtual memory system is substantially reduced. By alleviating redevelopment of the high level program code, virtual memory systems incorporating new CPU architectures will have fewer software defects and shorter time to market.

Another variation of the present invention provides a computer system comprising means for providing application programs for execution by the computer system, means for creating a virtual memory for use by the application programs, first virtual memory means for managing the virtual memory, and second virtual memory means responsive to the first virtual memory means for providing data to the first virtual memory means to manage the virtual memory.

According to another aspect of the present invention, the second virtual memory means comprises hardware means for performing data requests and hardware interface means for interfacing to the first virtual memory means by providing a data interface between the hardware means and the first virtual memory means. The hardware interface means further comprises means for providing a call to direct data requests from the first virtual memory means to the hardware means so that the hardware means can service the data requests of the first virtual memory means.

According to another aspect of the present invention, the hardware interface means further comprises means to receive the call and direct the hardware means to service the data requests. The first virtual memory means includes first program codes that are machine-independent with respect to the hardware means. The second virtual memory means includes second program codes that are machine specific to the hardware means. The first virtual memory means receives the data requests from the hardware means even though the first virtual memory means contains first program codes that are not machine specific to the hardware means. The hardware interface means of the second virtual memory means provides the machine specific codes for the hardware means. The separation of the first virtual memory means and the second virtual memory means allows the bulk of the combined virtual memory means to be ported between CPU types largely intact and unchanged. Thus, only modifications to the second virtual memory means, which are minor and simple compared to modifications to the first virtual memory means, are needed to permit the combined virtual memory means to be incorporated with other hardware means.

These and other advantages of the present invention will be more apparent from the following Detailed Description of the Invention, taken in conjunction with the Figures described below.

DESCRIPTION OF THE PREFERRED EMBODIMENT

Figure 1:
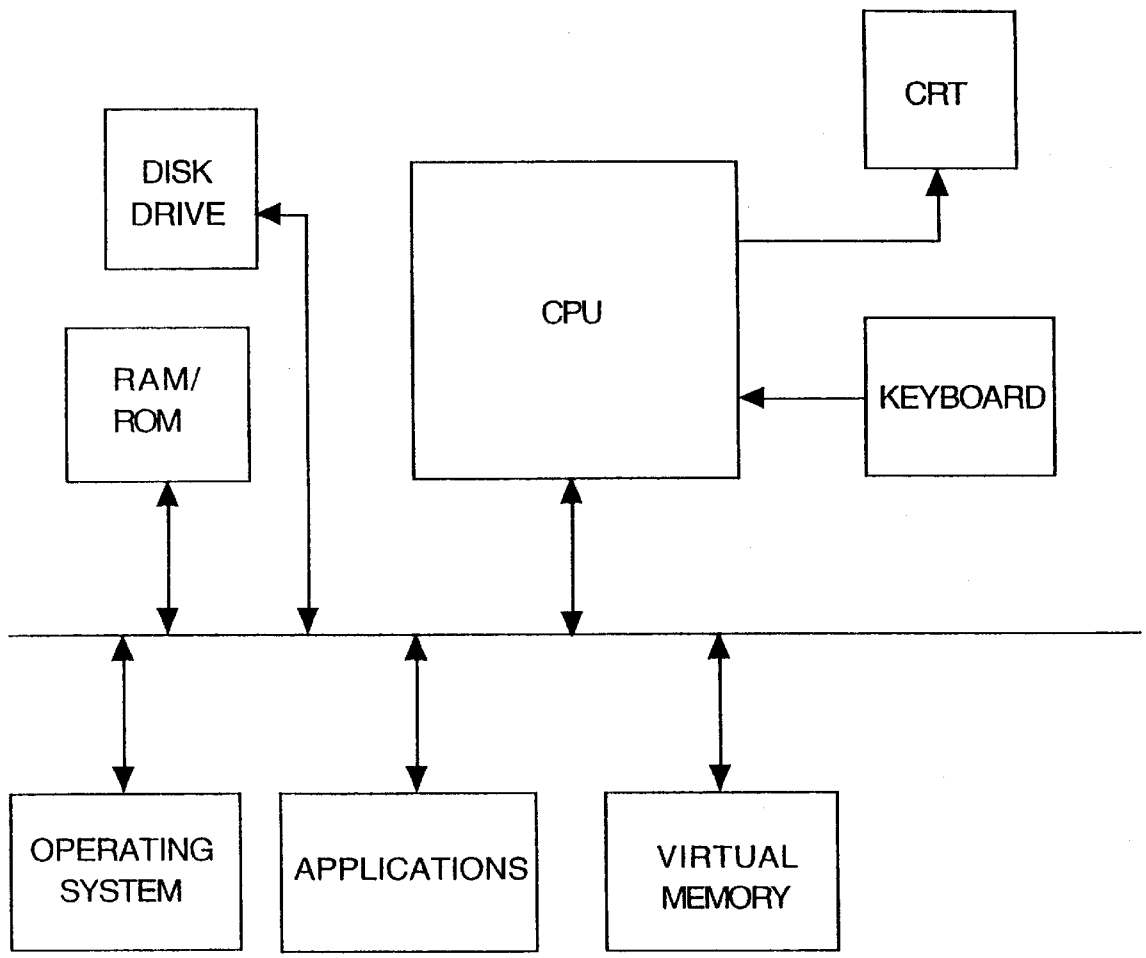
FIG. 1 is a block diagram showing an example computer system of the prior art.
Figure 2:
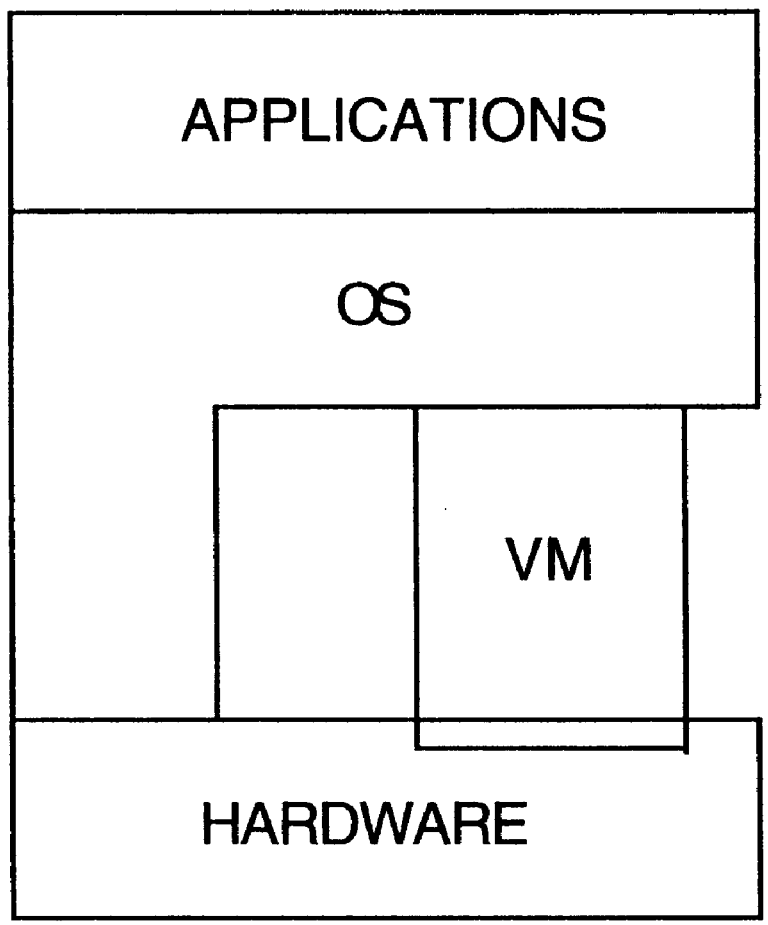
FIG. 2 is a block diagram showing the interaction between software and hardware elements of the example computer system of the prior art.
Figure 3:
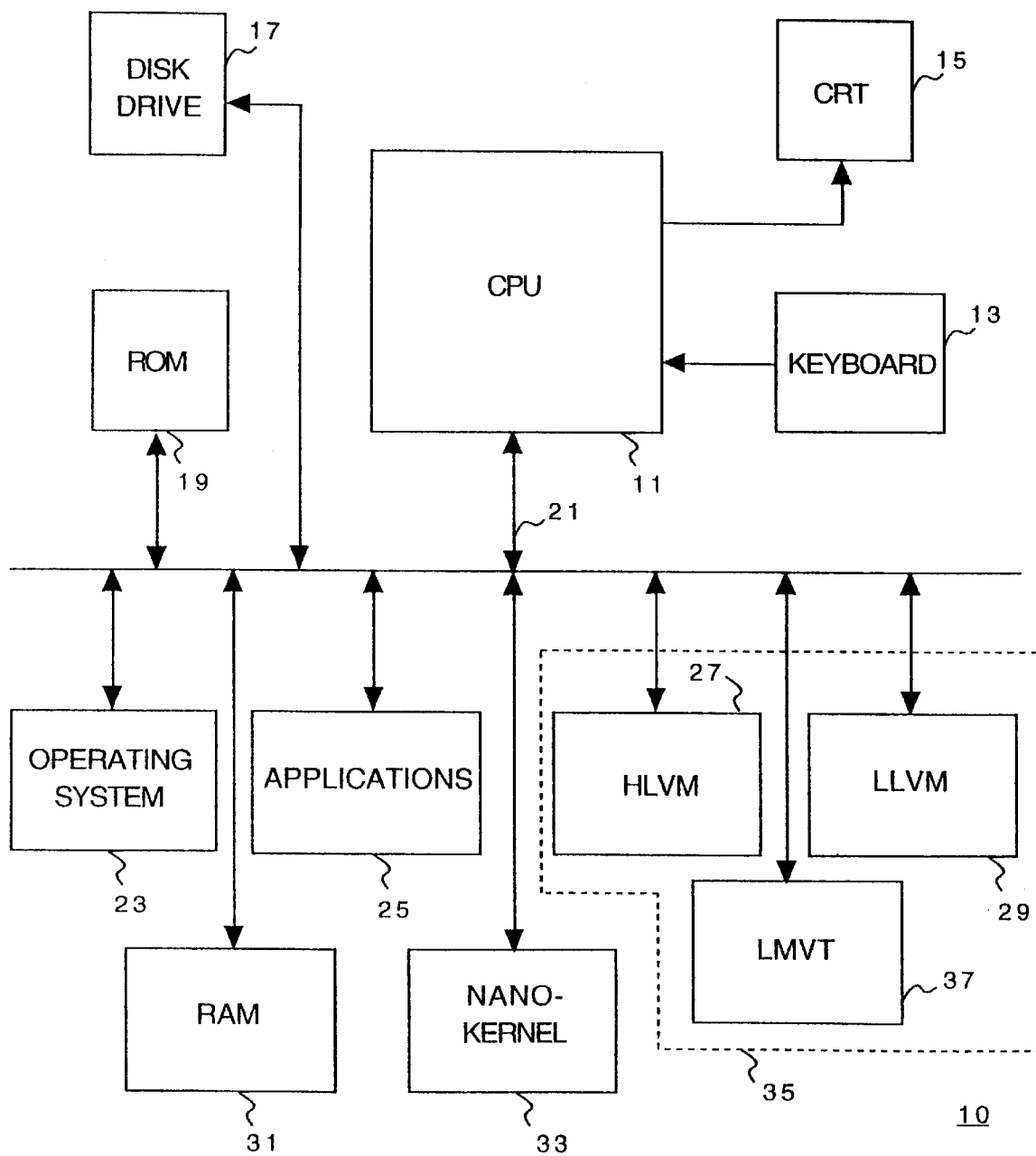
FIG. 3 is a block diagram showing a computer system having a CPU-independent virtual memory.

Referring now to FIG. 3, a block diagram is shown of a host computer system 10 capable of functioning with a virtual memory manager of the present invention. The host computer system 10 preferably comprises a central processing unit (CPU) 11, given amounts of random access memory (RAM) 31 and read-only memory (ROM) 19, an input device such as a keyboard 13, an output or display device such as a CRT 15, and a data storage means such as a hard disk drive 17. Other elements of the host computer system 10 include an operating system (OS) 23, application programs 25, a nanoKernel 33, and VM manager 35. All elements of the host computer system 10 are coupled to a common bus 21 in a Von Neumann architecture, where the common bus 21 further comprises an address bus, a data bus, and a control bus.

In an embodiment of the present invention, the host computer is a PowerPC based Macintosh computer manufactured by Apple Computer, Inc. of Cupertino, California. CPU 11 is a PowerPC processor such as the 60 MHz PowerPC 601 developed by Apple Inc., IBM Corporation and Motorola Inc. OS 23 is the System 7 software (from Apple Computer), originally developed to operate on the Motorola 68000 series of processors. NanoKernel 33 is a low level, firmware overlay which operates on CPU 11 to enable OS 23 to be ported from the 68000 processor series to the PowerPC processor. VM manager 35, although strictly speaking is generally viewed to be a component of the OS 23, is shown as a separate architectural component in the present discussion to more clearly explain the present invention. The function of VM manager 35 is to enable CPU 11, having access to limited RAM 31, to be able to efficiently address memory in hard disk drive 17 as though the addresses were mapped as a RAM component. In order to implement the CPU-independent VM manager 35 of the present invention, VM manager 35 is divided into a high level virtual memory (HLVM) unit 27 component and a low level virtual memory (LLVM) unit 29 component. A low memory vector table (LMVT) unit 37 is utilized to isolate the two VM manager 35 components (27 and 29) in order that portability of VM manager 35 may be easily implemented by modifying only LLVM unit 29 and LMVT unit 37, while leaving the complex HLVM unit 27 unchanged.

HLVM unit 27 stores high level code for implementing the virtual memory. Some of the functions that HLVM unit 27 provides include page fault handling, least recently used algorithm, page history/statistics, page access, user mode, disk I/O path, memory I/O path, CPU 11 exception dispatching, and initialization.

Page fault handling resolves paging errors which occur when CPU 11 addresses data that are not resident in physical (RAM 31) memory space. In a simplified virtual memory system, memory is divided into units called pages. At any time, some virtual pages of an application reside in physical memory space while other pages are stored on hard disk drive 17. Given that virtual memory is transparent to the application, each virtual page must be distinguished by whether or not it is in physical memory space. When a specific virtual page is requested during the execution of an application, CPU 11 refers to a page table. A page table contains information regarding virtual pages residing in the physical memory space. If the requested virtual page is residing in the physical memory space, the page table entry for the requested virtual page contains the address of the page in physical memory space. On the other hand, if the requested page is not resident in physical memory space, the page table entry is marked "not in physical memory" and a page fault occurs. When a page fault is encountered, CPU 11 interrupts the execution of the application program and calls VM manager 35 to service the page fault invoking the execution of the page fault handling code. The first function of the page fault handling code is to free up physical memory space by selecting a virtual page presently residing in the physical memory space and writing the selected virtual page to hard disk drive 17 if the page has been modified. If the page has not been modified, the page fault handling code simply overwrites the selected virtual page with the requested virtual page. Next, the page fault handling code transfers the requested virtual page from hard disk drive 17 to the vacated physical memory space and updates the page table entry to show that the requested virtual page is present in physical memory space. Finally, the page fault handling code modifies the entry for the vacated virtual page to show that the page no longer resides in the physical memory space and exits the interrupt as CPU 11 resumes execution of the application program.

Least recently used code is a page replacement algorithm. Page replacement is the process by which VM manager 35 determines which virtual page is to be replaced when another virtual page is requested to be resident in physical memory space. Many page replacement algorithms are available and known in the art. The basic concept of the page replacement algorithm is to find pages in the physical memory space that have not been modified, recently accessed, or have been modified but not recently written to hard disk drive 17. Considering these factors or a combination of these factors, the page replacement algorithm determines which virtual page is removed and possibly written to hard disk drive 17 to make space in physical memory space for a requested virtual page.

Page history/statistics code supplies data to the least recently used code whenever a virtual page replacement is required. Some of the data that the page history/statistics code provides include a list identifying the last time a virtual page in physical memory was modified, accessed, or written to disk. Using the data provided, the least recently used code makes a determination as to which virtual page in physical memory space is to be removed to make space for a requested virtual page.

Page access code provides an application programmer interface. The interface serves to provide application programmers a limited number of routines. An example of a routine is the page access code which can force VM manager 35 to maintain certain pages resident in physical memory space by not allowing those certain pages to be removed from the physical memory space.

User mode code allows the processor to execute an instruction not available in an unprivileged user mode and to perform a software emulation of that instruction. The emulation may either be a specially written emulator or execution of the instruction in a second or supervisor mode under close scrutiny. A detailed explanation of the user mode code is described in Graber, U.S. Pat. No. 5,063,499 entitled: "Method For Creating Virtual Memory System By Redirecting Access For User Stack Instead Of Supervisor Stack During Normal Supervisor Mode Processing". Graber is hereby incorporated by reference.

Disk I/O path code provides an I/O path for disk access to the virtual memory for transferring of data. Memory I/O path code provides the function of labeling and locating virtual pages of applications residing in the virtual memory.

CPU exception dispatching code provides the function of causing CPU 11 to interrupt its present task and execute VM manager 35 code so that a virtual memory function can be first performed. Page fault handling code is an example of one such exception.

Initialization code provides the function of setting up the virtual memory and initializing the registers and addresses that are used by VM manager 35.

LLVM unit 29 contains a relatively short amount (approximately 1000 bytes or 1 Kbyte) of CPU 11 specific code. HLVM unit 27, on the other hand, contains the bulk (approximately 30,000 bytes or 30 Kbytes ) of high level code. Thus, when VM manager 35 is developed, almost all of the time is spent designing and debugging the high level code of HLVM unit 27. The low level code of LLVM unit 29 responds to query functions of HLVM unit 27. LLVM unit 29 performs simple and low level functions that are in the form of machine executable calls. An example of a low level function that the LLVM unit 29 performs is page state querying. Page state querying retrieves data containing status and descriptor information concerning virtual pages residing in the physical memory space.

Page state querying code executes in response to data requests from an executing high level code of HLVM unit 27. The low level page state querying code of LLVM unit 29 is CPU 11 specific code that instructs CPU 11 to obtain page state data from the virtual pages residing in physical memory space. The page state querying code 11 acquires the data from CPU 11 and transfers the data to the requesting high level code of HLVM unit 27. Page history/statistics code is an example of a high level code that may invoke execution of the page state querying code. The page history/statistics code requests status information regarding when a particular virtual page was last modified, accessed, or written to disk. The execution of the high level page history/statistics code invokes the low level page state querying code. CPU 11 executes the low level page state querying code and provides descriptor and status information regarding the virtual pages in physical memory space to the high level page history/statistics code. After receiving the descriptor and status information, HLVM unit 27 utilizes the information to make management determinations regarding the operation of the virtual memory.

LMVT unit 37 contains dispatch vectors that direct the calls from the high level codes of HLVM unit 27 to LLVM unit 29. Query requests from HLVM unit 27 are sent to LMVT unit 37. LMVT unit 37 dispatches the query requests of HLVM unit 27 to a location within LLVM unit 29 to service the requests. LMVT unit 37 provides an interface between HLVM unit 27 and LLVM unit 29. Whenever HLVM unit 27 makes a query call to LLVM unit 29, it is LMVT unit 37 that actually receives the query call and directs the call to the LLVM unit 29. HLVM unit 27 is segregated from LLVM unit 29 by LMVT unit 37. LLVM unit 29 contains the machine executable calls for execution by CPU 11, and CPU 11 services the query requests of LLVM unit 29 which correspond to the requests of HLVM unit 27. Using this segregated structure, the characteristics of CPU 11 that actually service the query calls of HLVM unit 27 are structurally irrelevant. From the point of view of HLVM unit 27, any query requests it sends to LLVM unit 29 are returned with data in a useful form. Thus, segregation of HLVM unit 27 from LLVM unit 29 affords distinct advantages of making the VM manager 35 less dependent on a particular CPU. VM manager 35 becomes portable by requiring that only relatively minor changes be made to LLVM unit 29 before a new CPU 11 type is implemented with VM manager 35. Some of the vector calls of LMVT unit 37 may also require modification.

Figure 4:
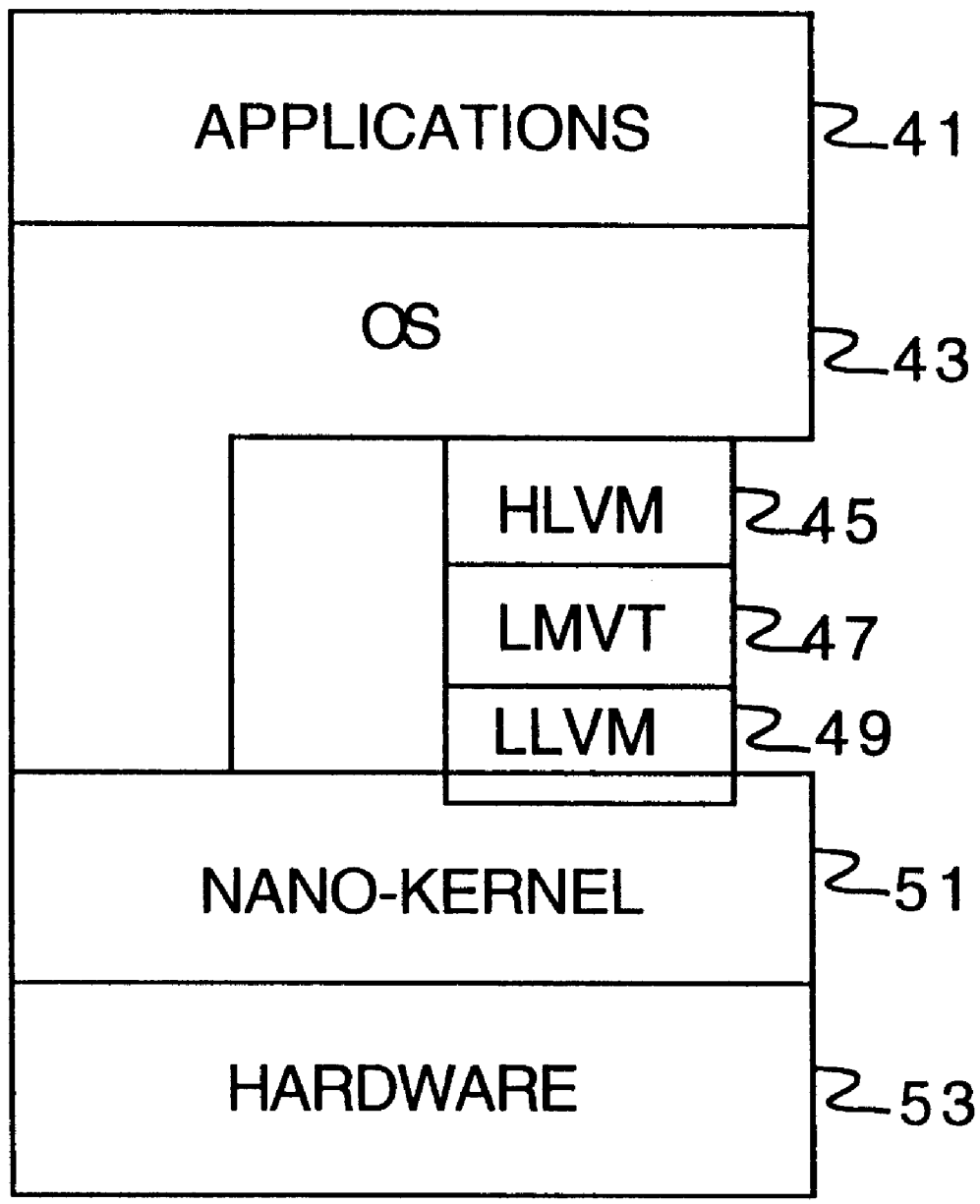
FIG. 4 is a block diagram showing the interaction between software and hardware elements of the CPU-independent virtual memory.

Referring now to FIG. 4, a block diagram illustrating the software architecture of the CPU-independent virtual memory is depicted. Application programs 41 represent the highest level in the host computer system's 10 software architecture, interacting with hardware 53 through OS 43 and nanoKernel 51. HLVM program code 45 is shown relatively isolated from the nanoKernel 51 and hardware 53 by LLVM program code 49. The LMVT 47 provides an interface between HLVM program code 45 and LLVM program code 49. The hardware 53 includes a CPU 11 (FIG. 3).

NanoKernel 51 is a kernel designed as an overlay to hardware 53. NanoKernel 51 receives LLVM program code 49 of LLVM unit 29 (FIG. 3) and translates LLVM program code 49 to CPU-specific requests that are executed by hardware 53. Hardware 53 executes LLVM program code 49 and obtains the data for the requesting LLVM program code 49. Hardware 53 transfers the data to nanoKernel 51, and nanoKernel 51 then transfers the data to the waiting LLVM program code 49.

In operation, HLVM program code 45 of HLVM 27 is executed as a result of an interrupt, requesting services from VM manager 35. As a result of this interrupt, HLVM program code 45 requests service from hardware 53. The service request is sent in the form of an address requesting the specific service. LMVT 47 receives the address and provides a corresponding address to LLVM program code 49 of LLVM unit 29 to respond to the service request. LLVM program code 49 contains CPU 11 specific code that is executed by hardware 53. NanoKernel 51 provides an emulation interface between LLVM program code 49 of LLVM unit 29 and hardware 53 to enable the hardware 53 to execute LLVM program code 49. Upon execution, hardware 53 obtains the requested data and transfers the requested data to nanoKernel 51, which then transfers the requested data to the waiting LLVM program code 49 of LLVM unit 29. LLVM program code 49 transfers the requested data to HLVM program code 45 of HLVM unit 27. Using this process, service requests of HLVM unit 27 which are not compatible with the hardware 53 can be serviced. In the case where the hardware 53 is compatible with the HLVM unit 27, the nanoKernel 51 is not required to provide the emulation interface between the LLVM unit 29 and the hardware 53. LLVM program code 49 of LLVM unit 29 may require slight modifications to enable HLVM unit 27, LMVT unit 37, and LLVM unit 29 of VM manager 35 to be operated with the compatible hardware 53.

By segregating the programming of VM manager 35 into HLVM program code 45 and LLVM program code 49, VM manager 35 which was designed for a specific CPU can be easily modified to operate with another CPU. According to the present embodiment, only modifications to LLVM program code 49 and nanoKernel 51 may be required to interface another specific CPU to VM manager 35. LMVT 47 may also require slight modifications.

A CPU-independent HLVM subsystem for a virtual memory has many advantages. The amount of new code required for interfacing an existing virtual memory design to new CPU architectures is minimized. For example, the complex high level code of the existing virtual memory design for handling page faults, memory page replacement algorithms, memory page access functions (such as cache-ability and read/write access) can be used with a new CPU architecture without modification to the existing HLVM program code 45 of HLVM unit 27. If a need arises to change CPU 11 to another type of processor, the new type CPU can be more easily inserted with minimum modification to the overall virtual memory system. Thus, new CPU architectures incorporating a virtual memory system can be perfected and marketed in a shorter time.

Figure 5:
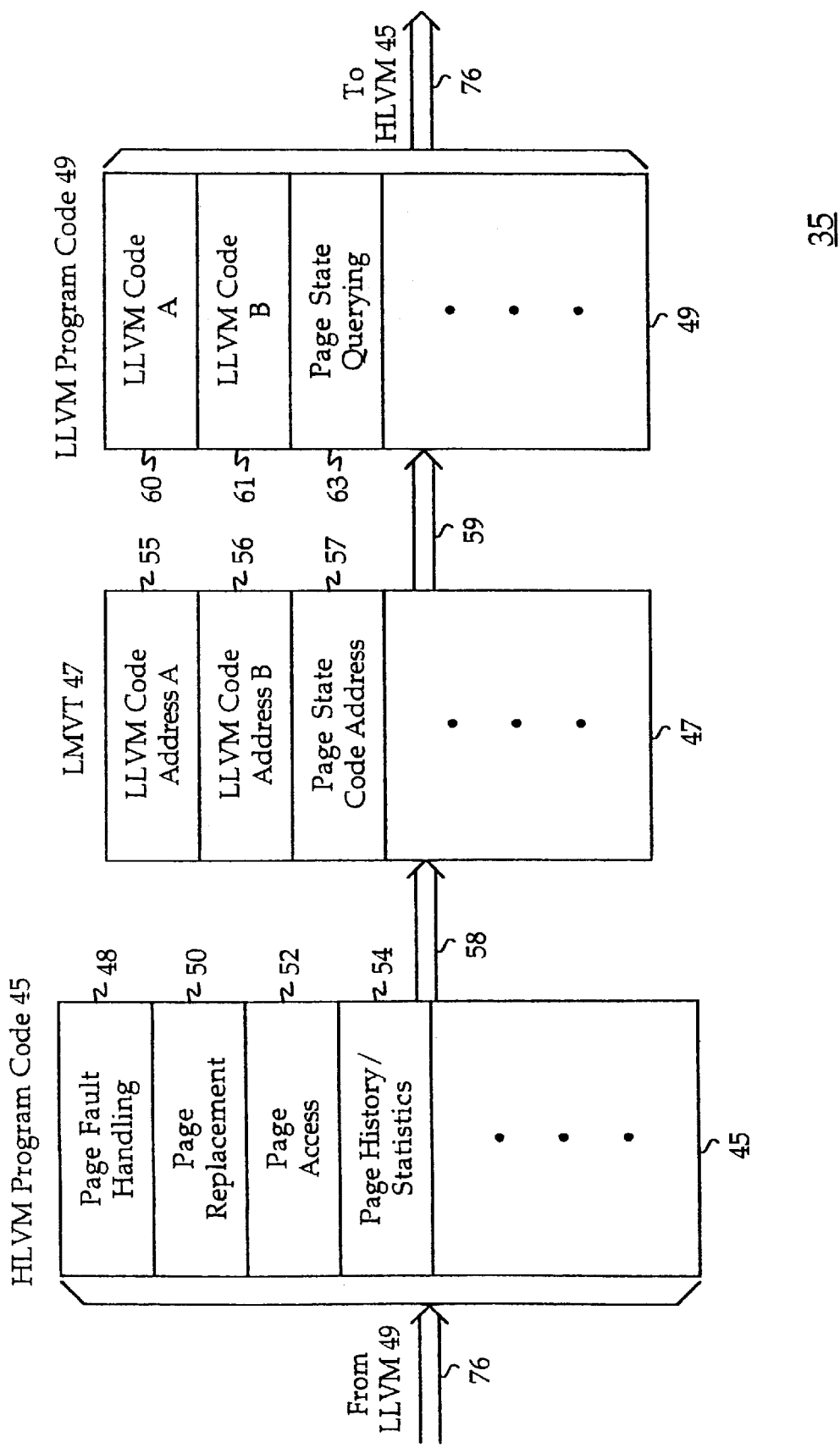
FIG. 5 is a block diagram of a CPU-independent virtual memory.

Referring now to FIG. 5, a block diagram is shown depicting an embodiment of the VM manager 35 of the present invention. The VM manager 35 is partitioned into three sections: HLVM program code 45, LMVT 47 and LLVM program code 49. The HLVM program code 45 of HLVM 27 is the section of the VM manager 35 that is CPU-independent, enabling the VM manager 35 to be ported among various processors. Page fault handling code 48, page replacement code 50, page access code 52, and page history/statistics code 54 are represented as examples of HLVM program code 45. LLVM program code 49 of LLVM unit 29 is the section of VM manager 35 that services the data requests from HLVM program code 45. LLVM program code 49 contains machine executable calls that are executed by CPU 11. LLVM code A 60, LLVM code B 61, and page state querying code 63 are represented in LLVM program code 49 of FIG. 5. LMVT unit 37 is the section of VM manager 35 that dispatches addresses to direct data requests from HLVM program code 45 of HLVM unit 25 to corresponding LLVM program code 49 of LLVM unit 29. LMVT 47 is a vector table for dispatching a call from a particular HLVM program code of HLVM program code 45 to a corresponding LLVM program code of LLVM program code 49. LLVM code address A 55, LLVM code address B 56, and page state code address 57 are represented in LMVT 47 of FIG. 5. Path 58 provides an interface from HLVM program code 45 to LMVT 47. Path 59 provides an interface from LMVT 47 to LLVM program code 49. Path 76 provides an interface from LLVM program code 49 to HLVM program code 45. An embodiment of the present invention of LMVT 47 incorporates a base address associated with a call from HLVM program code 45. The call also contains an element offset that is associated with the base address, where the base address is the address location of LMVT 47 within VM manager 35. The element offset determines a location within LMVT 47 that corresponds to an address for a program within LLVM program code 49.

By way of example, VM manager 35 of FIG. 5 is now discussed with reference to the execution of the page history/statistics code of HLVM program code 45. Page history/statistics code 54 transfers a data request that requires servicing by hardware 53. The data request is in the form of a base address and an element offset that corresponds to an entry of LMVT 47. In the present example, page history/statistics code 45 sends the data request via path 58 to LMVT 47. The base address portion of the data request identifies LMVT 47. The element offset portion of the data request selects the third entry of LMVT 47. The entry page state code address 57 of LMVT 47 corresponds to an address for the location of page state querying code 63 of LLVM program code 49. LMVT 47 dispatches the address via path 59 which calls page state querying code 63 to service the data requests of page history/statistics code 54. Upon execution of page state querying code 63 of LLVM program code 49, the requested data is obtained from hardware 53 (FIG. 4) and is transferred to page history/statistics code 54 via path 76.

Figure 6:
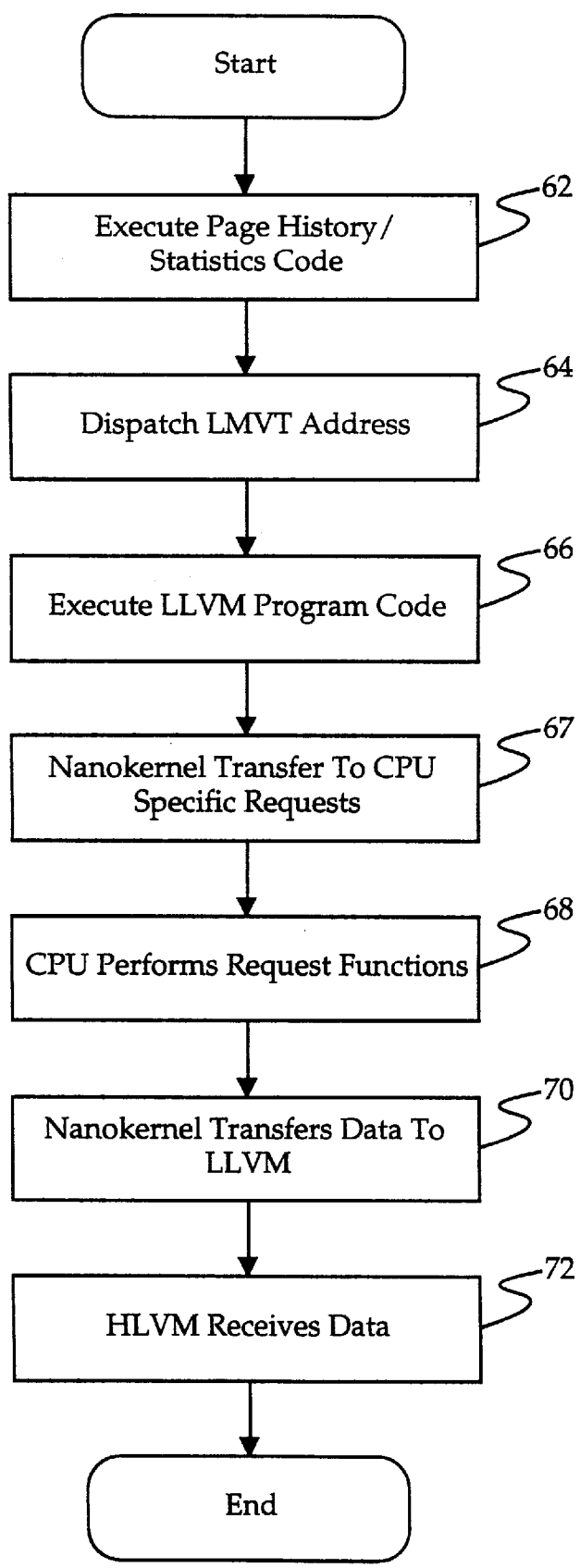
FIG. 6 is a flow diagram of the process directed to the execution of high level code by the CPU-independent virtual memory.

Referring now to FIG. 6, a flowchart of an embodied method of HLVM unit 27 is shown executing an exemplary page history/statistics code. Page history/statistics code requests data concerning the last time a virtual page in physical memory was modified, accessed, or written to disk. The method begins with step 62 by the execution of page history/statistics code in HLVM program code 45 (FIG. 6). In step 64, LMVT 47 receives an address corresponding to a request from HLVM program code 45 for page history/statistics data. The address contains a base address and an element offset. The base address and the element offset determines a call to a corresponding address of LLVM program code 49. LMVT 47 dispatches the address to LLVM program code 49. In step 66, the low level program code corresponding to the address is executed to service the request for page history/statistics data. NanoKernel 51 transfers the low level program code of LLVM program code 49 to CPU 11 specific requests in step 67. CPU 11 performs the specific requests and prepares the requested data for transfer in step 68. NanoKernel 51 receives the data from CPU 11 and transfers the data to the low level program code of LLVM program code 49 in step 70. The execution terminates in step 72 when the page history/statistics code of HLVM program code 45 receives the requested data from the low level program code of LLVM program code 49.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. A virtual memory system that is portable between different central processing unit (CPU) types, the system comprising:

a high level virtual memory (HLVM) having high level program codes that manage the virtual memory system and are independent of any specific CPU type;

a low memory vector table (LMVT) coupled to the HLVM that dispatches an address call in response to a high level program code request from the HLVM;

a low level virtual memory (LLVM) coupled to the LMVT having low level virtual memory management program codes that depend on a specific CPU type, wherein the LLVM receives the address call from the LMVT, which provides an interface between the HLVM and the LLVM, and the address call provides a location of a corresponding low level program code in the LLVM, and, in response to the address call from the LMVT, the LLVM returns data to the HLVM.

2. The virtual memory system of claim 1 wherein the call is an address which provides a location to the corresponding low level program code in the LLVM.

3. The virtual memory system of claim 1 further comprising a nanoKernel coupled to the LLVM which translates low level program codes for execution by the specific CPU type.

4. The virtual memory system of claim 3, wherein the nanoKernel of specific to the CPU type.

5. The virtual memory system of claim 1, wherein the HLVM and the LLVM are segregated, and the HLVM is independent of any specific CPU.

6. The virtual memory system of claim 1, wherein the LMVT isolates he HLVM from the LLVM, and the virtual memory system can accommodate different CPU types without modifying the HLVM.

7. The virtual memory system of claim 1, wherein the HLVM includes program codes for handling page faults.

8. The virtual memory system of claim 1, wherein the LMVT provides bidirectional communication between the HLVM and the LLVM.

9. The virtual memory system of claim 1, wherein the LMVT receives multiple high level program requests from the HLVM and dispatches multiple address calls in response to the multiple received high level program requests.

10. A method for operating a virtual memory system that is portable between different CPU types, the method comprising the steps of:

generating a high level virtual memory (HLVM) instruction from high level program codes that manage the virtual memory system and are independent of specific CPU characteristics;

receiving the HLVM instruction in a low memory vector table (LMVT);

dispatching an address call from the LMVT in response to the HLVM instruction;

receiving the address call from the LMVT in a low level virtual memory (LLVM) having low level virtual memory management program codes that depend on a specific CPU type;

executing CPU-specific instructions according to program codes in the LLVM corresponding to the address call received from the LMVT; and transmitting data from the LLVM to the HLVM, in response to HLVM instructions received by the LLVM.

11. The method according to claim 10, wherein the CPU-specific instructions are executed by the specific CPU type that is depended on by the LLVM.

12. The method according to claim 10, wherein the step of receiving the address call from the LMVT further comprises the step of processing the low level virtual memory management program codes from the LLVM using a nanoKernel prior to the execution of the CPU-specific instructions.

13. The method according to claim 12, further comprising the step of transferring from the nanoKernel to the LLVM, response data resulting from the execution of the CPU-specific instructions.

14. The method according to claim 13, further comprising the step of transferring the response data from the LLVM to the HLVM.

15. A virtual memory system that is portable between different central processing unit (CPU) types, the system comprising:

means for generating a high level virtual memory (HLVM) instruction from high level program codes that manage the virtual memory system and are independent of specific CPU characteristics;

means for receiving the HLVM instruction in a low memory vector table (LMVT);

means for dispatching an address call from the LMVT in response to the HLVM instruction;

means for receiving the address call from the LMVT in a low level virtual memory (LLVM) having low level virtual memory management program codes that depend on a specific CPU type;

means for executing CPU-specific instructions according to program codes in the LLVM corresponding to the address call received from the LMVM; and means for transmitting data from the LLVM to the HLVM, in response to HLVM instructions received by the LLVM.

* * * * *